Figure 1:
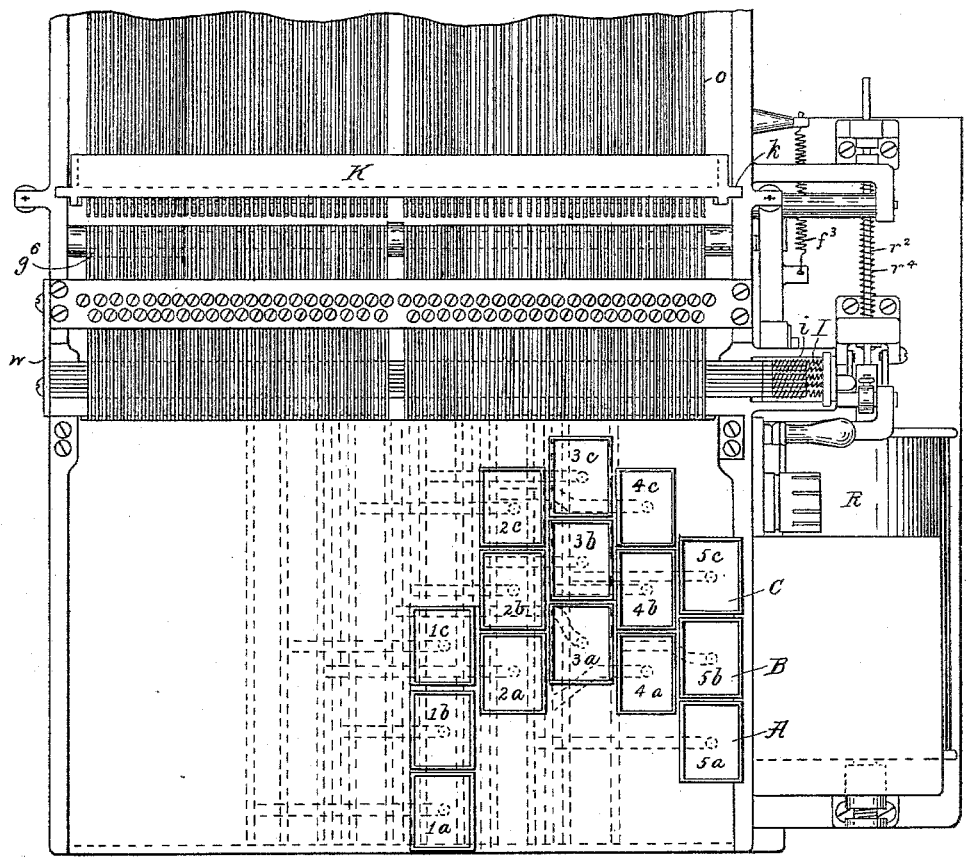

(No Model.)  E. B. KIRBY.  6 Sheets—Sheet 1.
KEYBOARD FOR TYPE WRITING MACHINES.

No 597,775.  Patented Jan. 25, 1898.

Witnesses.  Inventor.

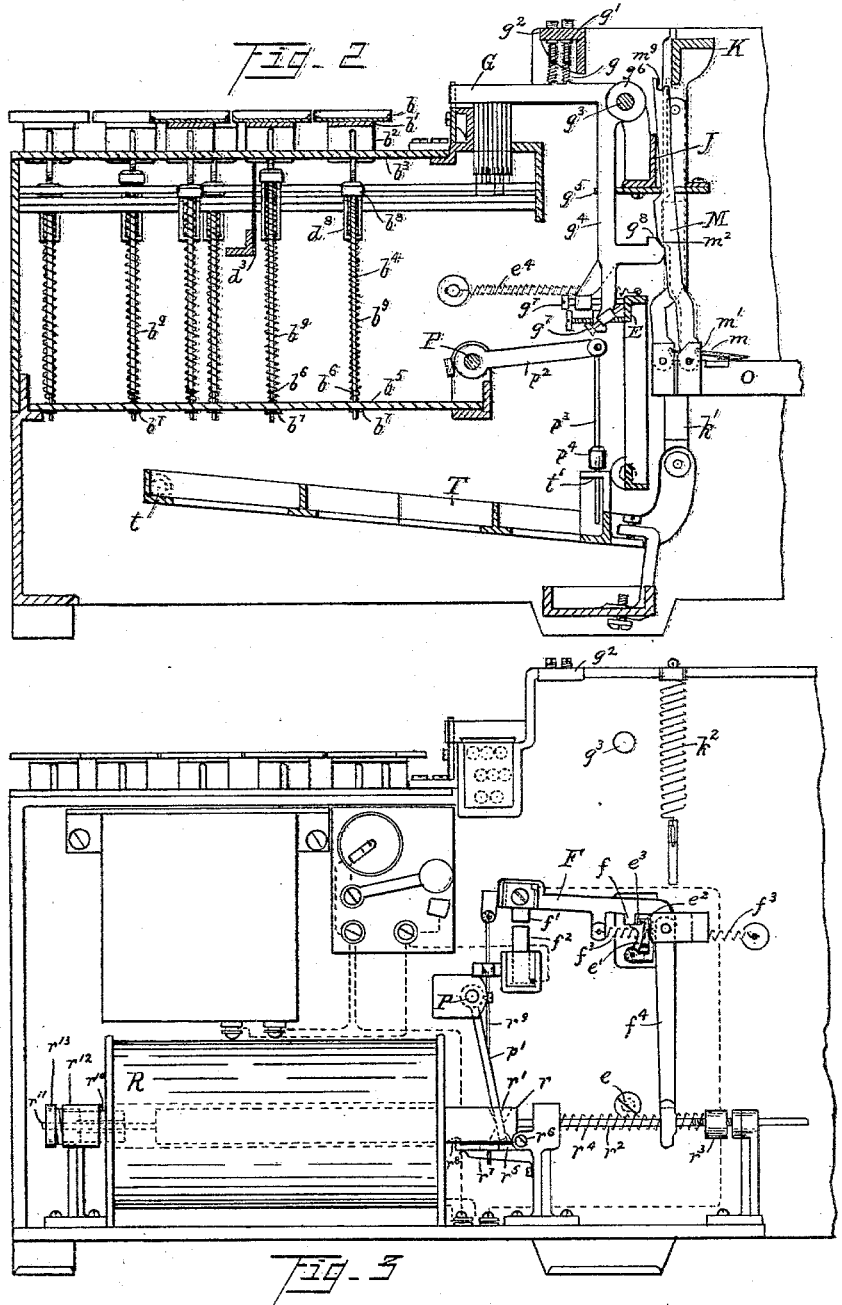

(No Model.) 6 Sheets—Sheet 3.
E. B. KIRBY.
KEYBOARD FOR TYPE WRITING MACHINES.
No. 597,775. Patented Jan. 25, 1898.
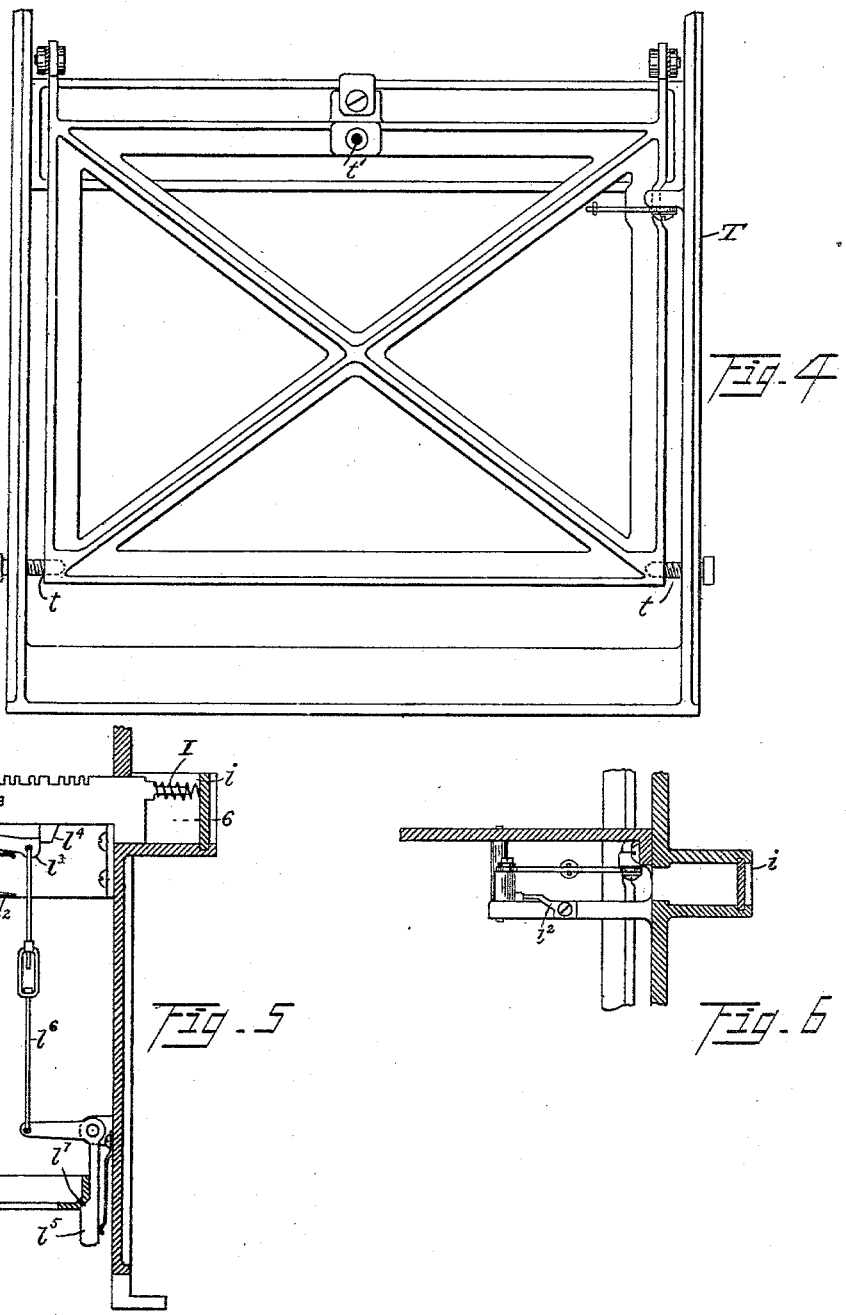
Witnesses
L. Griswold
Helen M. Hutchison.
Inventor.
Edmund B. Kirby
By E. L. Thurston
his attorney (No Model.) 6 Sheets—Sheet 4.
E. B. KIRBY.
KEYBOARD FOR TYPE WRITING MACHINES.
No. 597,775. Patented Jan. 25, 1898.
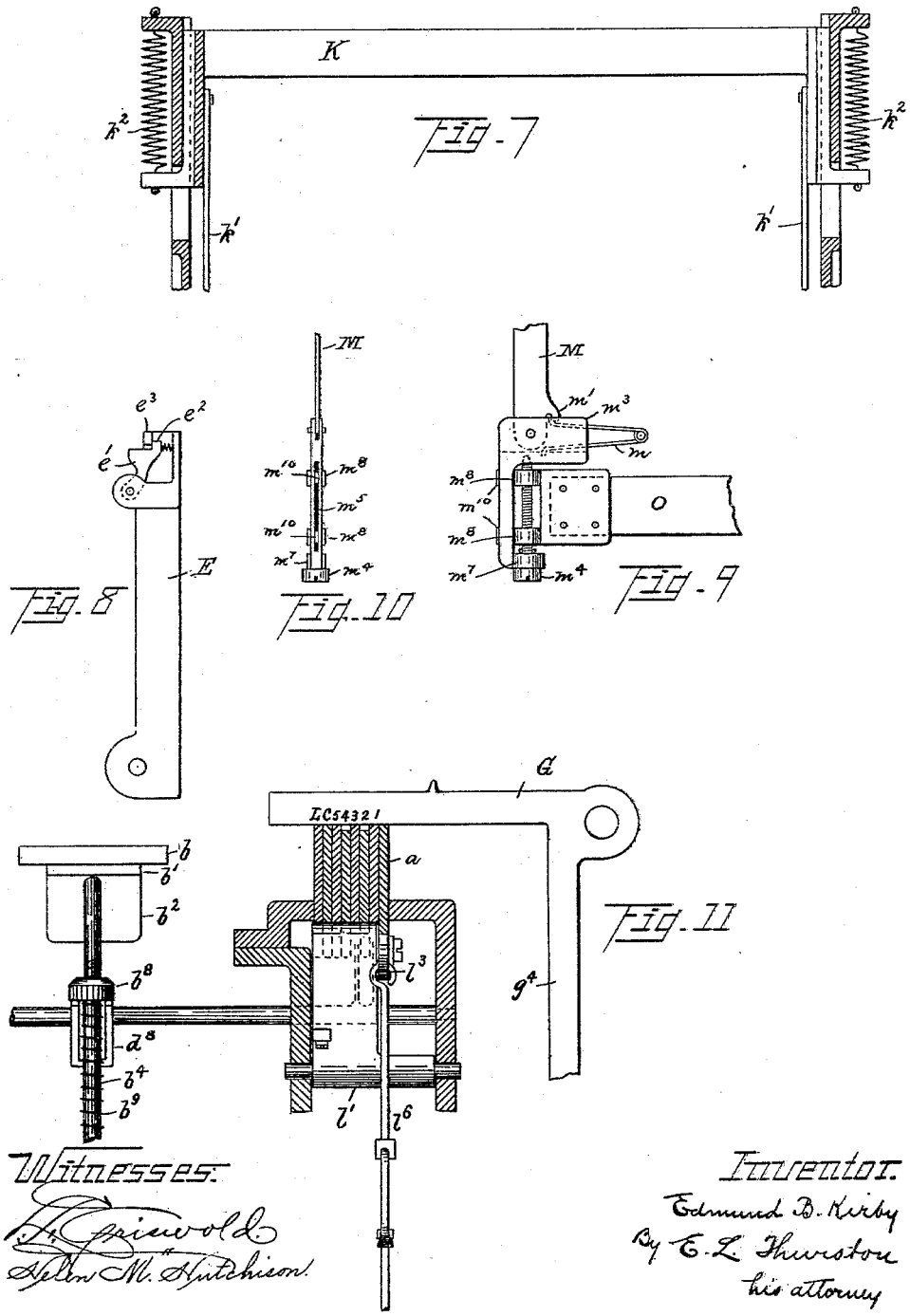

(No Model.)　　　　　　　　　　　　　　6 Sheets—Sheet 5.
E. B. KIRBY.
KEYBOARD FOR TYPE WRITING MACHINES.
No. 597,775.　　　　　　　　　Patented Jan. 25, 1898.
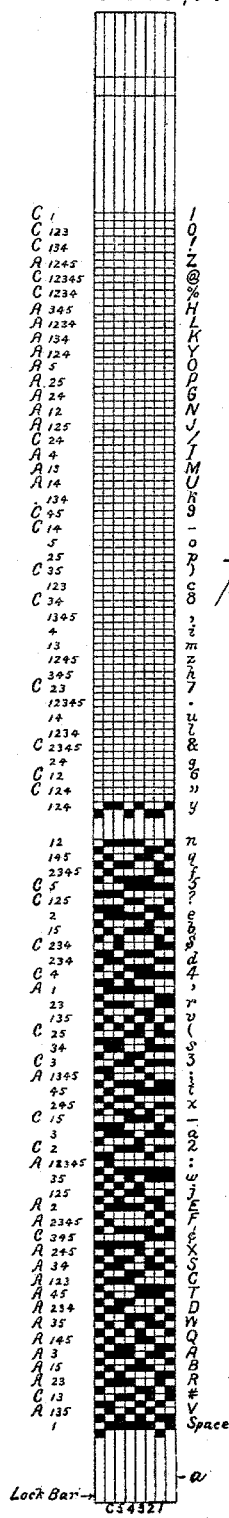
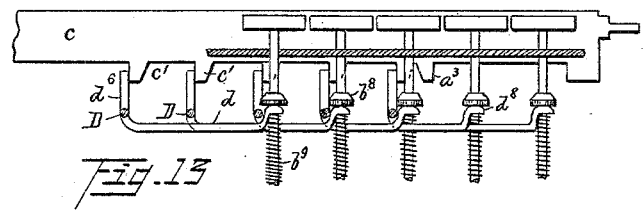
Fig. 13
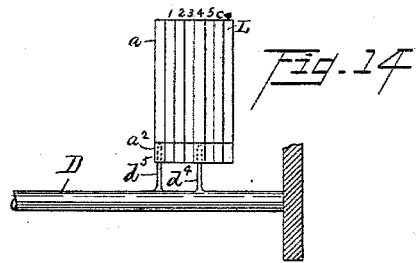
Fig. 14
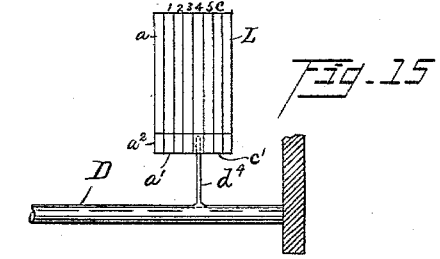
Fig. 15
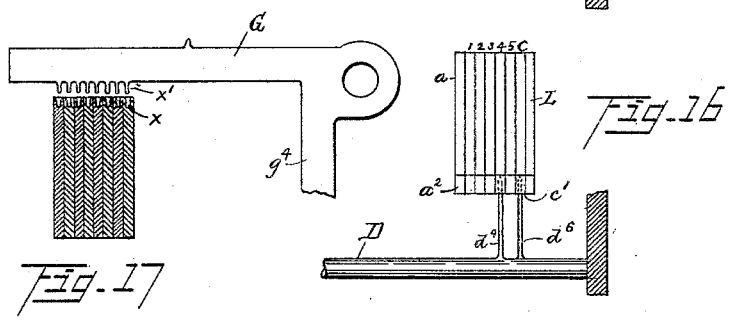
Fig. 17　　　Fig. 16
Witnesses.
　E. Griswold.
　Helen M. Hutchison.
Inventor.
　Edmund B. Kirby
　By E. L. Thurston
　　his attorney

UNITED STATES PATENT OFFICE.

EDMUND B. KIRBY, OF DENVER, COLORADO.

KEYBOARD FOR TYPE-WRITING MACHINES.

SPECIFICATION forming part of Letters Patent No. 597,775, dated January 25, 1898.

Application filed November 5, 1895. Serial No. 567,989. (No model.)

*To all whom it may concern:*

Be it known that I, EDMUND B. KIRBY, a citizen of the United States, residing at Denver, in the county of Arapahoe and State of Colorado, have invented certain new and useful Improvements in Keyboard Mechanisms for Type-Writers and other Analogous Machines; and I do hereby declare the following to be a full, clear, and exact description of the invention, such as will enable others skilled in the art to which it appertains to make and use the same.

My invention relates to a keyboard and the associated mechanism for operating type-writing machines or other analogous machines adapted to print, impress, or otherwise record or assemble characters in different combinations—such, for example, as stenographic machines, matrix-making machines, type-setting machines, telegraphy, calculating, and numbering machines, &c.

In all machines of the kind to which this invention is applicable the characters are printed, impressed, or released through the operation of finger-keys, which impart an operating impulse to levers, rock-shafts, or other equivalent operating elements. Generally one key is required for each character, although there are machines containing shift mechanism, which makes it possible for one key to operate either of several characters.

The object of my present invention is primarily to provide means for operating machines of the kind referred to with greater ease and accuracy and with greater average speed; and incidental to this principal purpose one object of the invention is to make it unnecessary to use one finger-key for each character (or two or three characters when shift mechanism is employed) and to make it possible to employ only a relatively small number of keys, whatever be the number of characters.

My invention, as will be seen by the subsequent description, is intended to be attached to machines of the character named by cutting off the usual bank of keys and then connecting my mechanism hereinafter described in an appropriate manner with the key-levers, rock-shafts, or other operating elements to which said finger-keys are connected.

The invention consists in the construction and combination of parts hereinafter described, and shown in the drawings, all of which will be definitely pointed out in the claims.

In using machines having the ordinary keyboard it is necessary before striking any one of the many keys to locate it exactly. With a bank of forty to eighty keys it is impossible for most operators to locate the keys so that they may be struck as desired without using the eyes to assist in locating them. This shifting of the eyes from the copy to the keys causes much loss of time and frequent errors. Moreover, it is necessary in order to obtain the best results with such machines as are now in common use to employ both hands. The mental act of locating the key is therefore accompanied by the mental selection of the hand and finger to be used in operating it. This complex mental act never becomes strictly automatic and therefore occupies considerable time, depending, of course, upon the proficiency of the operator. The movement of the hands into range with the keys to be struck after this complex mental act has been performed also occupies time. The time consumed by each of these muscular mental acts is of course small, but the aggregate loss of time occasioned thereby is very large. Another serious disadvantage of most of the machines in use, especially type-writers, is that the power to operate the mechanism is derived from the pressure of the fingers upon the keys. This prevents the delicacy of touch necessary for the most rapid work and makes prolonged work very tiresome. A number of machines of great mechanical merit have been commercial failures, because their touch was harder or more irregular than that of others.

A machine containing my mechanism is not open to criticism in any of the particulars above specified. The operator's hand remains in the same position relative to the keys at all times, except for the slight movement forward and back occasionally, as hereinafter described. No mental act is necessary to find any key or to determine which finger on which hand shall strike it. The eyes are of no use in locating any key, and need, therefore, never be removed from the copy. To cause the printing of any character, it is only necessary for an operator to press with one or two, or more, fingers simultaneously upon the key or keys which are always beneath them. Moreover, the pressure of the fingers does not furnish the power to operate the type-writer. This power is furnished from an independent source. In the form shown the power is obtained from an electric current—such, for example, as is supplied to the offices for light—and is translated by means of a solenoid. This is, however, a mere detail of the particular mechanism shown and is not an essential of the invention as broadly claimed. The power may be obtained from any convenient source, and the particular mechanism employed to transmit the power at the proper time will be suitable for the purpose. The keys, therefore, merely act as triggers. When a given combination of keys is depressed, two principal actions follow—first, the particular lever, rock-shaft, or other equivalent device of the type-writer or other machine which corresponds with said combination of keys is, as one might say, connected with the power-transmitting mechanism; second, the power is released long enough to cause said lever, rock-shaft, or other device to be operated. Following these results, the parts return to their normal positions.

I will now illustrate the embodiment of my invention which is shown in the drawings, in which—

Figure 18:
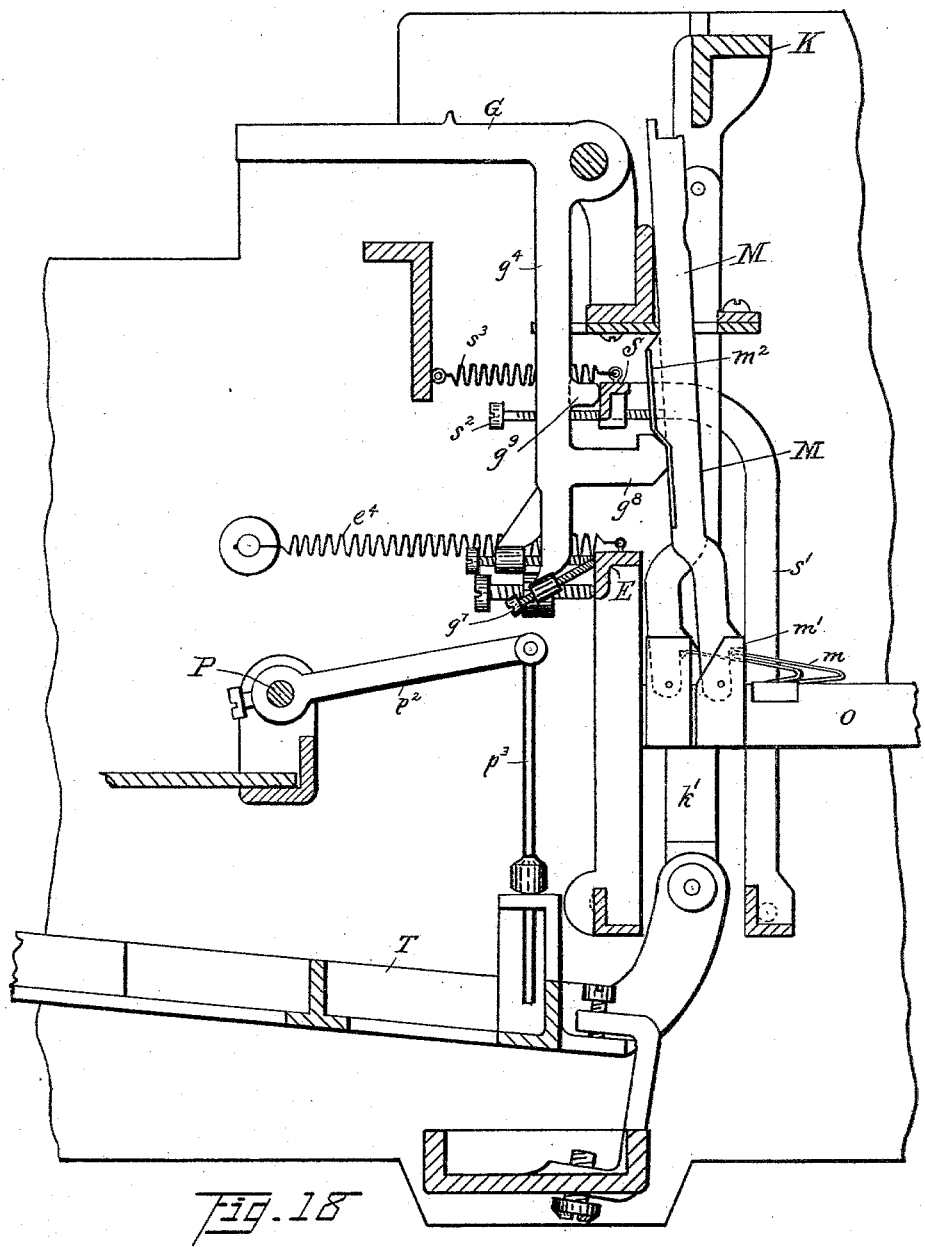

Figure 1 is a plan view of my improved mechanism. Fig. 2 is a vertical section on line 2 2 of Fig. 1, looking toward the left. Fig. 3 is a right end view of the machine. Fig. 4 is a plan view of the treadle mechanism. Fig. 5 is a detail of the mechanism through which the movement of each combination-bar is accompanied by a corresponding movement of the locking-bar. Fig. 6 is a sectional plan view of the mechanism shown in Fig. 5, the section being in the plane indicated by the line 6 6. Fig. 7 is a detail of the striking-bar mechanism immediately connected therewith. Fig. 8 is a right end view of the trigger-bar. Fig. 9 is a side view, and Fig. 10 is a front end view, of one form of adjustable connection between the push-rod of my mechanism and the lever of the type-writer or other machine with which it is to be used. Fig. 11 is a sectional view on line 11 11 of Fig. 5. Fig. 12 is a plan view of the combination-bars. Fig. 13 is a front view of the notched bar $c$ and the five keys and connecting mechanism of the C set. Fig. 14 is a sectional view of the combination-bars, together with a part of one rock-shaft connected with one of the A keys. Fig. 15 is a similar view showing one rock-shaft connected with the B keys. Fig. 16 is a similar view showing a rock-shaft which is connected with a C key. Fig. 17 is a sectional view of the combination-bars, showing a modified form of them and an associated letter-bar; and Fig. 18 is a sectional view of a modified form of the device when it is adapted to be used with a type-writer employing shift mechanism.

Referring now to the parts by letters and figures, A, B, and C represent, respectively, three banks of keys, each containing five keys, which are arranged to conform with the natural positions of the thumb and fingers of the right hand. The keys are indicated by $1^a\ 2^a\ 3^a\ 4^a\ 5^a$, $1^b\ 2^b\ 3^b\ 4^b\ 5^b$, $1^c\ 2^c\ 3^c\ 4^c\ 5^c$. The keys in each set are intended to be operated by the thumb and four fingers, respectively, and, as before stated, the keys constituting each set are arranged so as to be beneath the ends of the fingers of the operator when the fingers are in the most convenient position for operating them. The keys may of course be arranged to be operated by the left hand, if desired, or each set of keys may contain ten keys, if desired, to be operated by both hands. The middle set of keys (marked B) are preferably those which are intended to be most used—that is to say, are those which are manipulated to cause the printing or release of the small letters, period, comma, and space. The A set of keys, to operate which the hand is moved backward about an inch, so that the fingers are over the keys therein, may control the printing or release of any one of the capital letters, the apostrophe, semicolon, or colon. The C set of keys, which lie in front of the B set, may control the selection and printing or releasing of the numerals and various other characters. The various characters are selected by pressing down upon one of the keys or by pressing down two or more of the keys simultaneously by means of the fingers above them, which act also sets in motion the mechanism by which the selected character is printed or released.

It will be seen that with each set of keys thirty-one combinations are available, because one can make thirty-one combinations of the five keys. With the three sets of keys I am therefore able to make ninety-three combinations in all, which will enable one to select more characters than are ordinarily employed in type-writing or other analogous machines.

Extending transversely across the machine are eight, more or less, combination-bars 1, 2, 3, 4, 5, $a$, $c$, and L, which rest upon suitable supports near their ends and are susceptible of independent longitudinal movement. A spring I, inclosed in a spring-box $i$, is provided for each bar, and it exerts a constant pressure upon its bar to return it to its normal position, in which it strikes against a stop $w$ at the left end thereof. There are as many of these bars as there are keys in any one set of keys (in the present case five) plus one bar for every additional set of keys (in this case two) and a lock-bar—eight in all in the construction shown. In the top edge of each of these bars are formed the transverse notches 6, one-eighth of an inch, more or less, deep, which are separated from each other by the raised parts or stubs 7, the tops of these stubs being in a common plane. The width of these notches is such as to permit the easy entry of the letter-bars, which will be presently explained. The arrangement of these notches upon the several bars must have these characteristics, viz: First, they must be relatively so placed that when all of the bars are in their normal position there will be no continuous slot or groove extending across all of the bars formed by bringing into alinement the notches on all of the bars; second, they must be relatively so placed that when the bars are moved singly or in any of their different combinations (in the manner to be presently described) a clear slot shall be formed by alining the notches across the tops of all somewhere along their length and that only one of such slots shall be opened up at one time beneath the letter-bars.

Fig. 12 is a top view of the eight combination-bars, the white portions representing the raised parts or stubs and the intermediate black parts the notches. The notches, as shown in this figure, are arranged on these bars with special reference to adapting the machine for use with a "Caligraph" typewriter. At the left side of the figure (which is incomplete at the upper end) are letters and figures indicating which bars must be moved to form a clear slot at the point indicated and at the right will be seen the letter or character which will be printed or released as the result of opening up such slot. The relative position of these notches on the several bars will depend upon the position of the key-levers in the machine with which my invention is to be used and also, and more particularly, upon the keys and combinations of keys which it is thought best to move in order to select the different characters. I believe that it is preferable to arrange the notches so that the movement of single keys shall cause the selection and printing or release of the characters most used. Such system has been adopted in arranging the notches in the bars in the present machine, as will be seen by examining Fig. 12. These bars, either singly or in different combinations, are moved a short distance to the right—say .06 of an inch—by the operation of finger-keys and intermediate mechanism.

The keys are of comfortable size and preferably rectangular in form and are set almost in contact with one another. Each celluloid top $b$ of each key is secured on a horizontal base-plate $b'$, having on its under side a vertical guide-plate $b^2$, which moves vertically within a slot in the fixed top plate $b^3$ and prevents the key from twisting. The key is secured to the top of a vertical key-rod $b^4$ by any suitable means. The means shown consist of a slot in the rod, in which the guide-plate $b^2$ is secured. The lower end of this key-rod is reduced in size and passed through a hole in the lower fixed plate $b^5$. The shoulder $b^6$ thus formed permits a convenient key-stroke of about a quarter of an inch. A pin $b^7$, which passes through the lower end of this key-rod, constitutes the other stop. The upper end of each key-rod bears a screw-thread for about half an inch of its length, and upon this thread the adjusting-nut $b^8$ may be turned up or down to the exact position required. The spring $b^9$, which returns the key to its normal position, bears against this nut at one end and against the lower fixed plate $b^5$ at its other end. The nut also engages with the forked extremity $d^8$ of a key-lever $d$, which is rigidly attached to a rock-shaft D, wherefore the downward movement of the key must turn the shaft through a small arc. There are, of course, as many of these rock-shafts as there are keys, and they are placed in any convenient position. Each prong of the fork $d'$ of the key-lever is bent up to the level of the nut $b^8$ and then horizontally to bear upon its lower face. The rock-shafts D are suitably mounted in bearings at each end and may also be steadied by a vertical plate-bearing $d^3$ in the middle. Beneath the combination-bars short vertical lever-arms $d^4$ stand up from the rock-shafts, and these engage with lugs $a'$, formed for this purpose upon the lower edges of the combination-bars. Each lug $a'$ is simply a projecting part of the bar itself, and its preferred form is shown in Figs. 5 and 13. These lugs are placed wherever necessary to engage with the lever-arms $d^4$ on the rock-shafts. The lever-arms on the rock-shafts which are moved by the keys in the B set move the combination-bars 1, 2, 3, 4, and 5, respectively. Each rock-shaft which is moved by the B set has but one vertical lever-arm $d^4$ for communicating motion to the combination-bars. The rock-shafts D, which are moved by the A set of keys, are equipped with two lever-arms $d^4 d^5$. One of said lever-arms, $d^4$, engages with one of the bars 1, 2, 3, 4, or 5, while the other, $d^5$, engages with a lug $a^2$ on the bar $a$. The manipulation of any A key, therefore, moves not only one of the bars 1, 2, 3, 4, or 5, but the bar $a$ as well. The rock-shafts moved by the keys in the C set have also two lever-arms $d^4 d^6$, one of which, $d^6$, engages with a lug $c'$ on the bar $c$, while the other engages with a lug on one of the bars 1, 2, 3, 4, or 5. Therefore the manipulation of any key in the C set moves the same bar which the corresponding key in the B set would move, and it also moves the bar $c$.

As before stated, the drawings show a machine adapted for use with the "Caligraph" type-writer, which type-writer contains eighty-two main operating-levers, and the notches in the combination-bars are so arranged, substantially as shown, that eighty-two different slots extending across the eight bars may be opened up by the operation of the fifteen keys either singly or in combination, as described.

G represents the letter-bars, of which there is one bar for each slot, which may be formed across the combination-bars, as described. These letter-bars normally rest upon the stubs 7 of the combination-bars above the points where by the movement of said bars a slot will be formed. When such slot is formed, the letter-bar above said slot is forced into it by a spring $g$, which is compressed between the top of said bar and an adjustable spring-seat $g'$, projecting down from the transverse plate $g^2$. The moving of this particular letter-bar into the slot, as described, causes the printing or releasing of the particular character in the printing-machine with which it is associated. Obviously various forms of mechanism might be employed for producing this result when the letter-bar drops into a slot, and my invention, as hereinbefore explained, is independent of the particular mechanism employed for this purpose. I have, however, devised effective mechanism for producing the desired result, which is illustrated in the drawings and which I will now describe.

Each letter-bar, as shown, constitutes the horizontal arm of a bell-crank lever which oscillates about the fixed rod $g^3$ as its axis. These levers are held in the proper position relative to each other and to the combination-bars by slots in the fixed plate $g^5$, through which the vertical arms $g^4$ of said levers pass, and also by washers $g^6$, strung upon said rod $g^3$ between the levers. This vertical lever-arm $g^4$ extends downward and carries an adjustable screw $g^7$, the point of which when said letter-bar moves presses against a trigger-bar E and carries it forward to the extent of its movement—say one-tenth of an inch. This trigger-bar releases or renders operative the power which moves the striking-bar K. Said vertical lever-arm also bears a projecting head $g^8$, which rests in contact with one of the push-rods M, which are pivotally connected with the operating-levers O of the type-writer. Each push-rod is pivoted to the front end of one of the type-writer levers. A spring $m$, engaging with said lever and with a toe or projection $m'$ on the push-rod, exerts its force to throw the push-rod out of the vertical position, its upper end moving forward and resting against a fixed bar or plate J, which extends transversely across the machine.

The connection between the push-rods and the type-writer levers, rock-shafts, or other operating elements may vary with the construction of the type-writer to which the keyboard is attached. It will generally be preferable to pivot said push-rod to the type-writer levers in staggered positions, as shown in Fig. 2, in order to economize room.

When my invention is used in connection with a type-writer in which there is a turnbuckle forming a part of the connecting-rod between the type-bars (not shown) and the type-writer levers O, it is not necessary that this connection between the push-rod and the type-writer levers should be adjustable; but when the type-writer or other machine has no such adjustable connection between its parts it is desirable to have a connection between the push-rod of my mechanism and the type-writer levers. Such form of connection is shown in Figs. 9 and 10. From these figures it will be seen that the lower end of the push-rod is pivoted to a block $m^3$, which is connected with the type-writer lever by means of a screw $m^4$, by which the position of said plate on the type-writer lever may be vertically adjusted. In the block is a vertical slot $m^5$, through which pass two thin ends $m^{10}$, which project forward from the two ears $m^8$, and the screw $m^4$ passes through an ear $m^7$ on the block $m^3$ and screws up through said ears, its end entering an unthreaded hole in the block. The head $g^8$ rests against the front face of the corresponding push-rod just below a cam projection $m^2$ on the front side of said push-rod. The lower end of this projection is inclined and so also is the end of the head $g^8$, which bears against it. When one of the letter-bars G enters the groove formed across the combination-bars, the head $g^8$, acting upon the projection $m^2$, moves the said push-rod backward into a vertical position, so that its end is directly beneath the vertically-movable striking-bar K, as shown by the dotted lines in Fig. 2. The striking-bar extends transversely across the machine, its ends being set in vertical grooves $k$ in the sides of the frame of the machine. As soon as the push-rod is beneath the striking-bar said bar is moved down by suitable mechanism, one form of which is shown and will be hereinafter described, and in this downward movement of the bar the push-rod and the corresponding type-writer lever O are moved, with the usual result which follows the said movement of said type-writer lever. On the upper end of said push-rod is a notch $m^9$, into which the striking-bar enters, and the push-rod in front of said notch is extended up above the said striking-bar. Therefore its upper end engages with said striking-bar when the push-rod is swung backward and stops the said movement of the push-rod when it reaches the desired position. When the push-rod begins its downward movement, the beveled end of the projection $m^2$ acts upon the beveled end of the head $g^8$ and pushes the lever-arm $g^4$ forward, with the result of lifting the letter-bar G out of the slot in the combination-bars. The front face of said projection $m^2$ is vertical and holds the letter-bar above the combination-bars until the down-and-up stroke of the push-rod is nearly completed, during which time the combination-bars are returned by their springs to their normal position in readiness for another movement.

I may use any suitable power and mechanism for moving the striking-bar; but in the form of machine shown I derive the power from a solenoid-magnet R, which is connected in an open electrical circuit which is closed by the mechanism shown in the drawings and which I will now explain.

The solenoid-magnet is fixed in a suitable position at the bottom of the right side of my device. Its plunger $r$ is provided with a slot $r'$, into which a lever-arm $p'$ projects. This lever-arm is on a rock-shaft P, which extends transversely across the machine, and is mounted in suitable bearings.

T represents a treadle-frame, which extends across the machine and is pivoted to the sides thereof at its front end at $t$. Secured to both sides of the rear end of said treadle-frame are the links $k'$, which pass up and are secured, respectively, to the ends of the striking-bar K. Secured to the rock-shaft P near its middle is an arm $p^2$, and to this arm is pivoted a rod $p^3$, which extends down through a hole $t'$ in the treadle-frame. On the rod is an adjustable nut $p^4$, which lies above and bears against the treadle-frame. When, therefore, the solenoid-circuit is closed, it draws the plunger in, and this by moving lever $p'$ rocks the rock-shaft P, and through the described connections the treadle-frame is moved down. This movement is transmitted through the links $k'$ to the striking-bar K, which is then moved down, with the result before explained. Two springs $k^2$, secured to the striking-bar and framework, act to return all of the said parts to their former positions when the solenoid-circuit is broken. To complete the description of this operating mechanism, it remains to describe the means for closing and breaking the solenoid-circuit.

The trigger-bar E, which, as before explained, is in contact with the adjustable screw-points on the lower end of the levers $g^4$, is the top member of a rectangular frame which is pivoted at its lower end upon adjustable screw-points $e$, which project from the side frame members. The trigger-bar itself projects through the right frame member and carries a spring-pawl $e'$, having a shoulder $e^2$, which lies behind a shoulder $e^3$ on the trigger-bar. The toe $f$ of the electric switch-lever F rests upon this pawl $e'$. The switch is in the form of a bell-crank lever pivoted to a fixed pivot. On the end of its horizontal arm is a brass blade $f'$, which is adapted to enter between the brass spring-jaws $f^2$, and to thereby complete the circuit through the solenoid-coils. The switch is moved down in the direction to make this connection by a spring $f^3$. It is moved in the reverse direction by means of its vertical arm $f^4$, the lower end of which embraces a rod $r^2$, which is secured to the plunger of the solenoid. On this rod is an adjustable nut $r^3$, which, when the solenoid-plunger is being drawn in and has nearly completed its stroke, strikes the lever-arm $f^4$, thereby lifting the switch and breaking the circuit of the solenoid. The plunger is then drawn out of the coils by a spring $r^4$. When the trigger-bar is moved backward, a shoulder $e^3$ draws the pawl $e'$ from beneath the toe of the switch, which thereupon closes, and the other movements follow, as described. If the trigger-bar returns to its normal position before the switch is raised, the pawl strikes the toe and moves backward, and as soon as the switch is raised the pawl-spring moves the pawl forward beneath said toe. A locking-pawl $r^5$ for the plunger is pivoted to a short post $r^6$, and it is moved by a spring $r^7$ into engagement with a recess $r^8$ in the solenoid-plunger. It is released by means of a rod $r^9$, which is connected with the switch-lever, and which, when the switch-lever is moved to complete the circuit, presses down on the locking-pawl and releases the plunger. A rubber buffer $r^{10}$ receives the surplus energy of the plunger when moving into the solenoid-coils, and it is prevented from rebounding when it has moved out by the locking-pawl $r^5$. The plunger is provided on its inner end with a guide-rod $r^{11}$, which passes through the post $r^{12}$, and on the front end of said rod is an adjustable nut $r^{13}$, which limits the return movement of said plunger. The trigger-bar frame E is returned to and held in position against an adjustable stop-screw by springs $e^4$.

Returning now to the consideration of the combination-bars, attention is called to that one which is specifically the lock-bar L. The stubs on this bar lie normally beneath every letter-bar. Therefore it is obvious that no letter-bar can move down, however the other combination-bars may move, unless the lock-bar also moves. This lock-bar has, however, no direct connection with a key; but nevertheless it is moved whenever any combination-bar is moved, and this movement is effected by means of certain special mechanism, which I will now explain. On the under side of each of the seven other combination-bars is a push-lug $a^3$, and all of these push-lugs bear against a swinging block $l'$, which is pivoted beneath them and is held in place by a spring $l^2$. To this block is pivoted a pawl $l^3$, which engages with a lug $l^4$ on the lock-bar, Fig. 5, and consequently when any one or more of the other combination-bars are moved the swinging block is moved and the pawl moves the lock-bar, and then, as before stated, the selected letter-bar falls into the slot thus opened. The described mechanism then operates to print the corresponding character. If the fingers were not promptly lifted and if no provision were made to prevent such action, the bars would remain in said last position and the same letter-bar would again fall into the same slot as soon as the letter had been printed, and the same character would be again printed or released. To prevent this, I have provided means for releasing the lock-bar and permitting it to return to its normal position before the mechanism for causing the impression has performed its work, whether or not the pressure on the keys has been released. The mechanism in the form shown includes a bell-crank tripping-lever $l^5$, the horizontal arm of which is connected by the adjustable rod $l^6$ to the pawl $l^3$. On the vertical arm of the said lever is a beveled projection $l^7$, which the rear edge of the treadle-frame T strikes when it begins its downward movement, thereby rocking the rock-shaft and drawing the pawl $l^3$ down out of engagement with the lug $l^4$ on the lock-bar. The lock-bar then springs back to its original position, by which a stub is placed below each of the letter-bars. No letter can drop until the lock-bar is again caught by the pawl and moved to the limit of its travel to the right, and before this can occur the treadle must complete its stroke, so as to release the trip-lever. Moreover, every one of the seven combination-bars in contact with the swinging block must return to its normal position before the released pawl can again engage with the lock-bar lug. It is therefore apparent that the printing or release of any character cannot be repeated unless the keys are released and pressed down a second time.

As before stated, every stub must be withdrawn from beneath a given letter-bar before it can descend. It may sometimes happen that in moving the proper combination letter-bars to open up the desired slot another slot will be opened. Therefore it is necessary to move some bar which by its movement will not close the slot which one wishes to be opened, but will move a stub in line with the other slot which one does not wish to remain open. For instance, the three stubs on combination-bars 2 and 3 and lock-bar L stand beneath the letter-bar which corresponds with the letter "r." When these three bars are moved simultaneously to the right, a slot will be opened, into which said letter-bar will drop. Under the letter-bar which corresponds with "R" are four stubs on combination-bars $a$, 3, and $a$ and the lock-bar L. When all of these bars are moved so as to open a slot into which said letter-bar may drop, it is obvious that they will at the same time move the three bars and stubs which open the slot beneath the letter-bar which corresponds with "r." The letter-bar corresponding with "r" would also therefore drop into its slot if it were not for the fact that the fourth bar $a$ has at this point been provided with a stub which, when the bar $a$ is moved so as to open up a slot beneath the letter-bar corresponding with "R," will move beneath the letter-bar corresponding with "r" and prevent its fall.

There are certain machines, as before stated, where by the employment of shift-key mechanism the depression of one key may cause either of several characters to be printed. The Remington and Hammond type-writers are examples of this class of machines. In order to adapt my mechanism to be used with machines having shift mechanism, it is necessary to modify the construction of my mechanism so that, when desired, the striking-bar may strike not only a push-rod attached to the type-writer lever which one wishes to operate, but a second push-rod, which is attached to and operates the shift-lever of the type-writer. Fig. 18 shows one form of construction by which this result may be attained. The letter-bars will be classified in pairs arranged side by side. Both letter-bars of a pair will be adapted to operate the same push-bar, and one of them will be adapted to also operate a push-rod which is connected with the type-writer shift-lever. Except that it does not have the cam projection, this shift-lever push-rod is shaped like the other push-rods and is indicated by the dotted line in Fig. 18. The cam projection $m^2$ on the push-rod of the type-lever is extended laterally, so that the projecting heads $g^8$ on both of the letter-bars in the pair will strike it and move the push-rod, in the manner described, beneath the striking-bar. On one letter-bar of the pair there is a second projection $g^9$, which engages with the front side of the shift-bar S, which extends transversely across the machine and forms the upper member of the rocking frame, the sides $s'$ of which are pivoted to the two sides of the machine. Passing through this shift-bar is an adjustable screw $s^2$, the end of which engages with the shift-lever push-rod. A spring $s^3$, secured to the shift-bar and to a stationary part of the machine, returns said shift-bar to its normal position.

The operation of the parts described is as follows: If it is desired to print a character on the Remington machine, which involves the operation of the shift-lever, the combination-bars are moved so that that letter-bar of the pair corresponding with the desired character which is adapted to operate the shift-bar will drop into a slot. Then the head $g^8$ on the vertical arm of the letter-bar lever strikes the push-rod which is attached to the type-writer lever and moves it beneath the striking-bar. At the same time the small projection $g^9$ strikes the shift-bar S and moves it backward. The screw $s^2$, which it carries, engages with the push-rod of the shift-lever and likewise moves it beneath the striking-bar. Then when the striking-bar descends it pushes down both push-rods, with the result of operating the shift-lever of the type-writer and the desired type-lever thereof.

I have shown in the drawings and herein described only one form of power-producing mechanism by means of which the several parts of the mechanism are operated. It is, however, obvious that any power which will begin to act each time a push-rod is moved beneath a striking-bar and which will cease to act when the various parts have made one complete movement may be substituted without any material change in the parts of the device within which my invention is embodied, and it is not my intention to limit my invention to the solenoid described or to any other particular form of power-producing device, except in the few claims where such limitation is particularly set forth.

I have shown and described only one form of the letter-bars—viz., a bell-crank lever one arm of which acts directly upon the push-rods; and this I believe to be the simplest and in many respects the best construction. It is, however, obvious that said letter-bars might be constructed in other forms and that their movement might be effectively transmitted to the push-rods by other mechanism than that shown. Indeed, I have devised other mechanism for this purpose which I intend to describe and claim in other applications for patents. I do not, therefore, intend that my invention shall be limited to the particular mechanism shown by means of which the movement of any letter causes the operation of the corresponding type-writer lever or rock-shaft, except in the claims where such limitation clearly appears.

In place of running the notches across the combination-bars one might make holes $x$ in the top thereof, and pins $x'$ could be secured to the under side of the letter-bars, as shown in Fig. 17. When such bars are moved so as to bring the holes in all of the bars into alinement beneath any letter-bar, it will fall, and the same results will follow as with the preferred construction hereinbefore explained. This construction is therefore regarded as the full equivalent of the notched bars recited in the claims and hereinbefore described.

Among the advantages which arise from my invention may be named the following:

First. It is not necessary to locate and move the fingers into range with the key which it is desired to strike, because the fingers generally remain upon the same keys, and there are but two occasional and simple changes of position, forward and backward, to sets A and C.

Second. The eye and hand are absolutely free to follow copy, shift the platen, &c.

Third. The force required to move the keys may be made of any delicacy required by adjusting the tension of the key-springs. The muscles of the fingers are therefore relieved from furnishing the power required to operate the machine, and a delicacy of touch heretofore unknown may therefore be secured with any form of type-writer.

Fourth. It is no longer necessary to select the particular finger out of ten which shall be used to strike the particular key selected.

Fifth. The operation of my keyboard becomes automatic to the brain, nerves, and muscles in the strict scientific sense of the term. With practice the muscles operating the fingers automatically move them into the successive positions required when a given series of letters is presented to the consciousness, the fingers assuming those positions without any conscious selection or mental effort or strain, just as the hand traces the letters in writing or strikes the chord upon the piano or controls the strings to a violin.

Having described my invention, I claim—

1. In a type-writer, or analogous machine, the combination of a plurality of notched combination-bars which are susceptible of independent longitudinal movement, a series of independent letter-bars which extend across the notched edges of said combination-bars, and independent springs acting upon said several letter-bars to hold them in contact with one or more of the stubs on the combination-bars between the notches therein under normal conditions and to move them severally into the slots formed by the alinement of notches across the combination-bars when the latter are moved, the keys and intermediate mechanism for moving one or more of said notched bars to withdraw the supporting stub or stubs from engagement with any letter-bar and to aline the notches in said combination-bars beneath said letter-bar, with the operating elements (levers, rock-shafts, &c.,) of a type-writer or analogous machine, and mechanism for severally actuating the operating elements which correspond with the letter-bars which so move into the alined notches, substantially as and for the purpose specified.

2. In a type-writer, or analogous machine, the combination of a plurality of notched combination-bars which are susceptible of independent longitudinal movement, the keys, and connecting mechanism for moving them, with a series of independent pivoted letter-bars which extend across said combination-bars and normally rest upon stubs between the notches therein and are adapted to move severally into slots beneath them formed by the alinement of said notches, and independent springs acting upon the said letter-bars to hold them against said stubs and to move them into said notches when the stubs are withdrawn, substantially as and for the purpose specified.

3. In a type-writer or analogous machine, the combination of a series of notched combination-bars which are susceptible of independent longitudinal movement, keys, and intermediate mechanism for moving said bars, with a series of independently-movable letter-bars which extend across the notched edges of said combination-bars, springs for independently moving said letter-bars into the slots beneath them across the combination-bars formed by the alinement of the notches in the combination-bars, the operating elements of a type-writer, push-rods pivoted thereto, a movable striking-bar for pushing said push-rods, mechanism whereby the movement of any letter-bar into a slot across the combination-bars causes the movement of the corresponding push-rod to a position beneath the striking-bar, and operating mechanism for said striking-bar, substantially as and for the purpose specified.

4. In a type-writer or analogous machine, the combination of two or more sets of keys, notched combination-bars susceptible of independent longitudinal movement, the number of said bars being equal to the number of keys in each set plus one additional bar for each additional set of keys, mechanism transmitting motion severally from the keys in one set to the corresponding combination-bars, mechanism transmitting motion from each key in each additional set of keys to the corresponding combination-bar, and mechanism transmitting motion from every key in each additional set of keys to the corresponding additional combination-bar, substantially as and for the purpose specified.

5. In type-writers and analogous machines, the combination of a plurality of notched combination-bars, susceptible of independent longitudinal movement, an equal number of keys, and operating mechanism connecting said keys severally with said bars, with an additional longitudinally-movable notched lock-bar, and operating mechanism transmitting motion from every key to said lock-bar, substantially as and for the purpose specified.

6. In type-writers and analogous machines, the combination of a plurality of notched combination-bars which are susceptible of independent longitudinal movement, keys, and mechanism for transmitting motion severally from said keys to the combination-bars, with a longitudinally-movable notched lock-bar, mechanism for moving said lock-bar when any combination-bar is moved, letter-bars extending across the combination-bars and lock-bar, and which are adapted to move severally into slots formed by alining beneath them, notches on all of the combination-bars and lock-bar, substantially as and for the purpose specified.

7. In type-writing and analogous machines, the combination of a plurality of notched combination-bars which are susceptible of independent longitudinal movement, keys, and mechanism for transmitting motion severally from said keys to the combination-bars, with a longitudinally-movable notched lock-bar, having a lug on one edge, a movable block, lugs on all of the combination-bars in engagement with said block, a device carried by said block and adapted to engage with the lug on the lock-bar, substantially as and for the purpose specified.

8. In a type-writer or analogous machine, the combination of a plurality of longitudinally-movable notched combination-bars, keys, intermediate mechanism for operating said bars severally, and springs for returning said bars to their normal position, with a longitudinally-movable notched lock-bar, a spring for returning it to its normal position, a spring-actuated movable block, lugs on all of the combination-bars in engagement with said block, a spring-pawl carried by said block, a lug on the lock-bar with which said pawl is adapted to engage, means for releasing said pawl from such engagement, a plurality of spring-actuated letter-bars which extend across the notched edges of said combination-bars and lock-bar, and are adapted to move severally into slots in all of said combination-bars formed by the alinement of the notches therein, and mechanism whereby when any letter-bar so moves, the corresponding character will be printed or released, substantially as and for the purpose specified.

9. In a type-writer or other analogous machine, the combination of a plurality of longitudinally-movable notched combination-bars, keys, and intermediate mechanism, with letter-bars which extend across the notched edges of said bars and are adapted to move severally into the slots beneath them formed by the movement of said bars and consequent alinement of notches in all of them, the operating elements of the type-writer, push-rods engaging therewith, a movable striking-bar, and mechanism whereby the described movement of a letter-bar moves the corresponding push-rod beneath the striking-bar, and operating mechanism for said striking-bar, substantially as and for the purpose specified.

10. In a type-writer or other analogous machine, the combination of a plurality of spring-actuated notched combination-bars which are susceptible of independent longitudinal movement, keys, and connecting mechanism, and spring-actuated letter-bars which extend across the notched edge of said combination-bars, and are adapted to move severally into the slots formed beneath them across all of said combination-bars by the movement of said combination-bars, with the operating elements of the type-writer, push-rods connected therewith, a movable striking-bar, its operating mechanism, mechanism transmitting motion from each letter-bar to its corresponding push-rod to move the latter beneath the striking-bar, a trigger-bar for releasing the striking-bar-operating mechanism, and mechanism transmitting motion from each letter-bar to the trigger-bar, substantially as and for the purpose specified.

11. In type-writers and analogous machines, the combination with the type-writer-operating elements, push-rods pivoted thereto, a striking-bar, mechanism for operating it, a trigger for releasing said operating mechanism, springs for moving the push-rods out of range of the striking-bar, the keys, and mechanism intermediate of said keys and push-rods whereby any push-rod may be moved into range of the striking-bar, substantially as and for the purpose specified.

12. In a type-writer or other analogous machines, the combination of a plurality of notched combination-bars, susceptible of independent longitudinal movement, keys, and intermediate mechanism, with a series of bell-crank levers, the horizontal arms of which lie across the notched edge of said combination-bars, springs for moving said arms into slots opened up across said combination-bars by their movement, a head projecting from the vertical arm of the bell-crank lever, a series of push-rods having beveled projections with which said heads severally engage, a striking-bar, and mechanism for actuating it, substantially as and for the purpose specified.

13. In type-writers and analogous machines, the combination of a series of notched combination-bars susceptible of independent longitudinal movement, keys, mechanism transmitting motion from the keys to the bars, with spring-actuated letter-bars which extend across the notched edge of said combination-bars and are adapted to enter slots formed therein by the alinement beneath them of notches on all of said combination-bars, the operating elements of the type-writer, push-rods secured thereto and having cam projections on their edges, levers having heads which engage with said cam projections, a striking-bar and mechanism for operating it, substantially as and for the purpose specified.

14. In a type-writer or other analogous machine, the combination of a plurality of notched combination-bars susceptible of independent longitudinal motion, keys, and intermediate mechanism, spring-actuated letter-bars which extend across the combination-bars and are adapted to enter slots formed across said combination-bars by their described movement, the operating elements of the type-writer, push-rods secured thereto, levers arranged in pairs adapted to engage with one push-rod, the shift-operating device of the type-writer, a push-rod secured thereto, a movable shift-bar adapted to be moved by one lever of each pair of levers and to move the last-named push-rod, a striking-bar, and mechanism for actuating it, substantially as and for the purpose specified.

15. In a type-writer or other analogous machine, the combination of the longitudinally-movable notched combination-bars, keys, intermediate mechanism, spring-pressed letter-bars extended across the notched edges of said combination-bars, the type-writer-operating elements, push-rods connected thereto, a movable striking-bar, and mechanism for moving any push-rod into range with the striking-bar when its corresponding letter-bar is moved, with a solenoid connected in an open circuit, an electric switch for closing said circuit, a trigger for releasing said switch, and mechanism for transmitting motion from the solenoid-plunger to the striking-bar, substantially as and for the purpose specified.

16. In a type-writer or other analogous machine, the combination of the letter-bars and mechanism for operating them, the type-writer-operating elements, push-rods pivoted thereto, a striking-bar, a treadle, links connecting the treadle and striking-bar, a solenoid connected in an open circuit, a switch for closing said circuit, a trigger-bar for releasing said switch, a rock-shaft, an arm thereon engaging with the solenoid-plunger, a second arm on said rock-shaft, and a rod transmitting motion from the second rock-shaft arm to the treadle, substantially as and for the purpose specified.

In testimony whereof I affix my signature in presence of two witnesses.

EDMUND B. KIRBY.

Witnesses:
C. D. GREENALL,
NELLIE PRESTON.